United States Patent
Riesselmann et al.

[11] Patent Number: 5,926,889
[45] Date of Patent: Jul. 27, 1999

[54] VEHICLE RAMP CONSTRUCTION

[75] Inventors: Eric Riesselmann, Cedar Grove; Kawa-She-Quden Wm. Okerlund, Wittenberg, both of Wis.

[73] Assignee: Fulton Performance Products, Inc., Mosinee, Wis.

[21] Appl. No.: 08/904,659

[22] Filed: Aug. 1, 1997

[51] Int. Cl.⁶ ........................................... E01D 1/00
[52] U.S. Cl. ............................................. 14/69.5; 14/71.1
[58] Field of Search .................................. 414/537, 69.5, 414/71.1, 72.5; 14/69.5; 52/69, 71, 69.5

[56] References Cited

U.S. PATENT DOCUMENTS

| | | |
|---|---|---|
| 1,504,744 | 8/1924 | Cox . |
| 1,568,303 | 2/1926 | Webster .................................. 14/69.5 |
| 1,635,462 | 7/1927 | Cummings . |
| 1,659,928 | 2/1928 | Townsend . |
| 2,122,301 | 6/1938 | Soss et al. . |
| 2,141,529 | 12/1938 | Gravelle . |
| 2,779,489 | 1/1957 | Boom . |
| 3,339,968 | 9/1967 | Hall . |
| 3,352,440 | 11/1967 | Wilson . |
| 3,510,015 | 5/1970 | Roshaven . |
| 3,517,772 | 6/1970 | Weis et al. . |
| 3,642,156 | 2/1972 | Stenson . |
| 3,735,454 | 5/1973 | Goldstein . |
| 3,737,058 | 6/1973 | Johnson . |
| 3,818,528 | 6/1974 | Peterson . |
| 4,127,201 | 11/1978 | Baumann . |
| 4,478,549 | 10/1984 | Stelly et al. . |
| 4,722,109 | 2/1988 | Mountz . |
| 4,726,155 | 2/1988 | Nahmias .................................. 52/71 |
| 4,735,454 | 4/1988 | Bernard . |
| 4,761,847 | 8/1988 | Savage et al. . |
| 4,853,999 | 8/1989 | Smith . |
| 4,874,284 | 10/1989 | New, Jr. . |
| 4,995,129 | 2/1991 | Comardo . |
| 5,096,362 | 3/1992 | Best . |
| 5,133,584 | 7/1992 | McCleary . |
| 5,133,634 | 7/1992 | Gingrich et al. . |
| 5,156,432 | 10/1992 | McCleary . |
| 5,169,202 | 12/1992 | Cupp et al. . |
| 5,211,437 | 5/1993 | Gerulf . |
| 5,273,335 | 12/1993 | Belnap et al. . |
| 5,325,558 | 7/1994 | Labreche . |
| 5,438,308 | 8/1995 | Floe . |
| 5,440,773 | 8/1995 | Lentini . |

FOREIGN PATENT DOCUMENTS

| | | |
|---|---|---|
| 499208 | 2/1939 | United Kingdom . |
| WO 89/06199 | 7/1989 | WIPO . |

*Primary Examiner*—Thomas B. Will
*Assistant Examiner*—Raymond W Addie
*Attorney, Agent, or Firm*—Edgar A. Zarins; Leon E. Redman; Myron B. Kapustij

[57] ABSTRACT

A vehicle ramp construction to facilitate the loading and unloading of a vehicle bed such as the bed of a pick-up truck. The ramp may be deployed in conjunction with any raised surface to permit movement of a wheeled item from ground level to a raised platform. The ramp includes a ground engaging end and an upper end adapted to seat at the edge of the vehicle bed. A hinge assembly is provided to allow simple folding of the ramp for storage. The hinge assembly allows use of the folding ramp as a single unit held together by the hinge or as separated spaced apart ramps for each wheel set of the vehicle moved into the bed. The hinge assembly includes stop members which prevent separation of the ramp sections when deployed side-by-side but allow convenient separation when the ramp sections have been folded together.

5 Claims, 2 Drawing Sheets

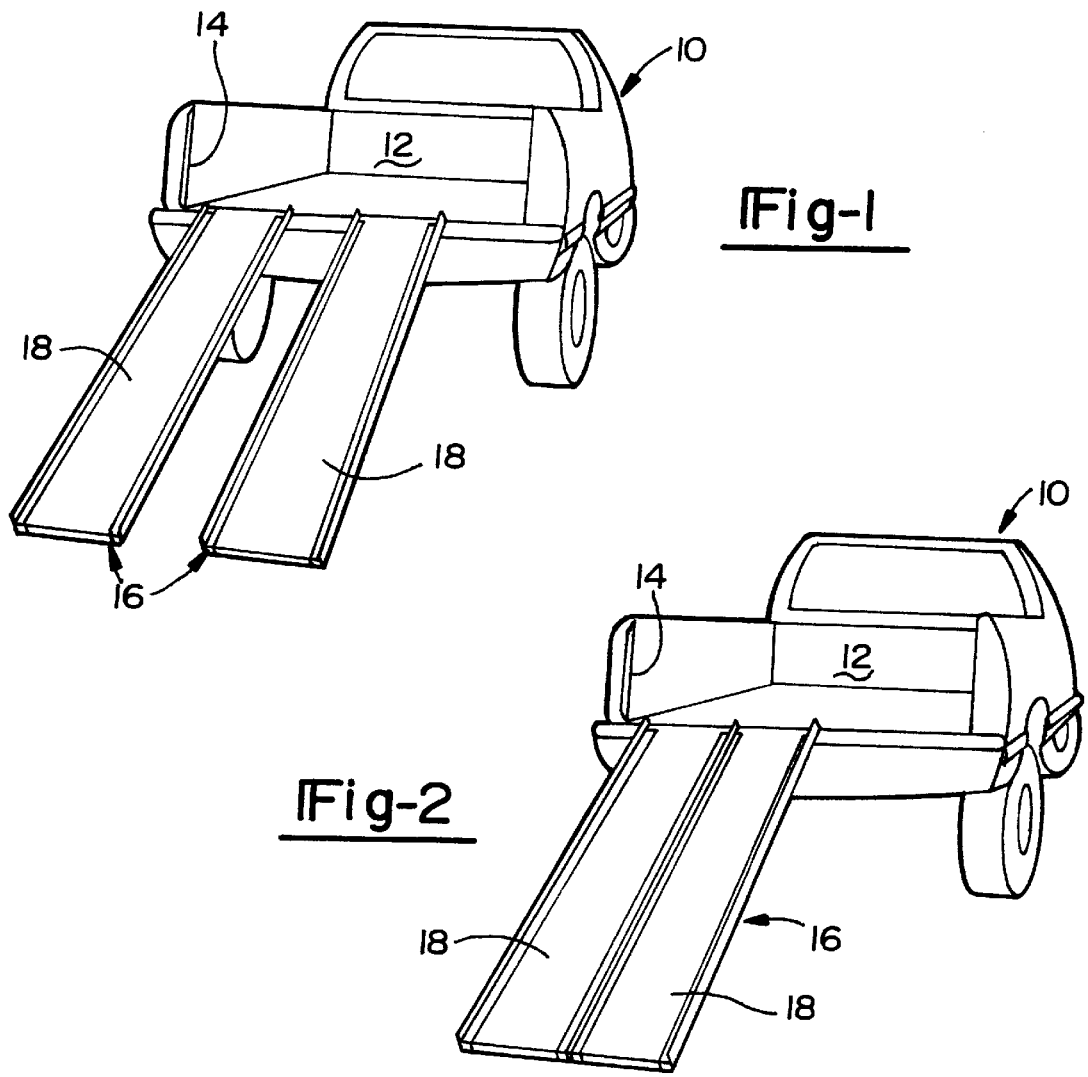
Fig-1
Fig-2
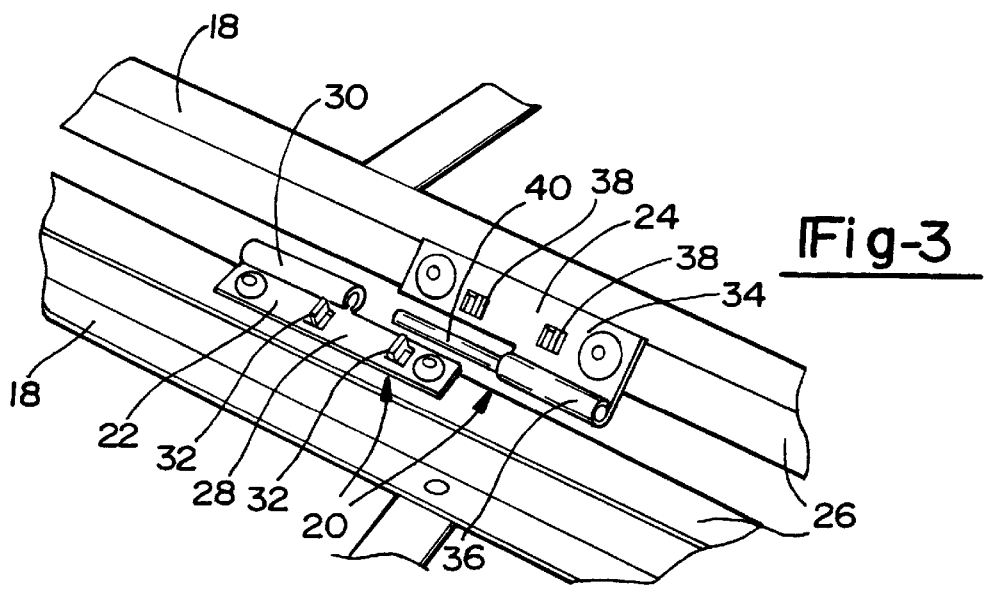
Fig-3

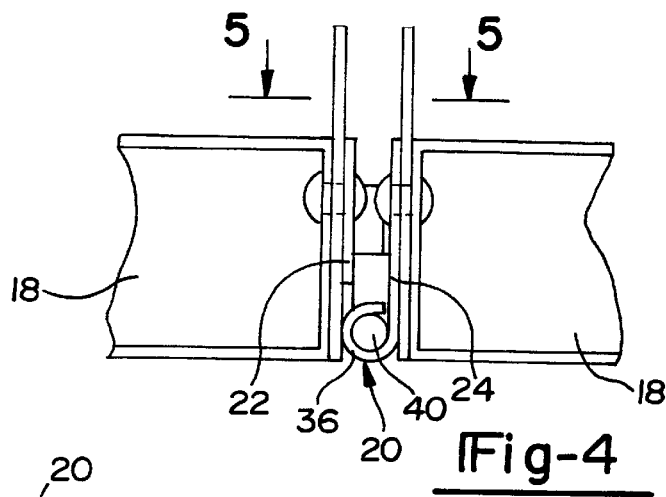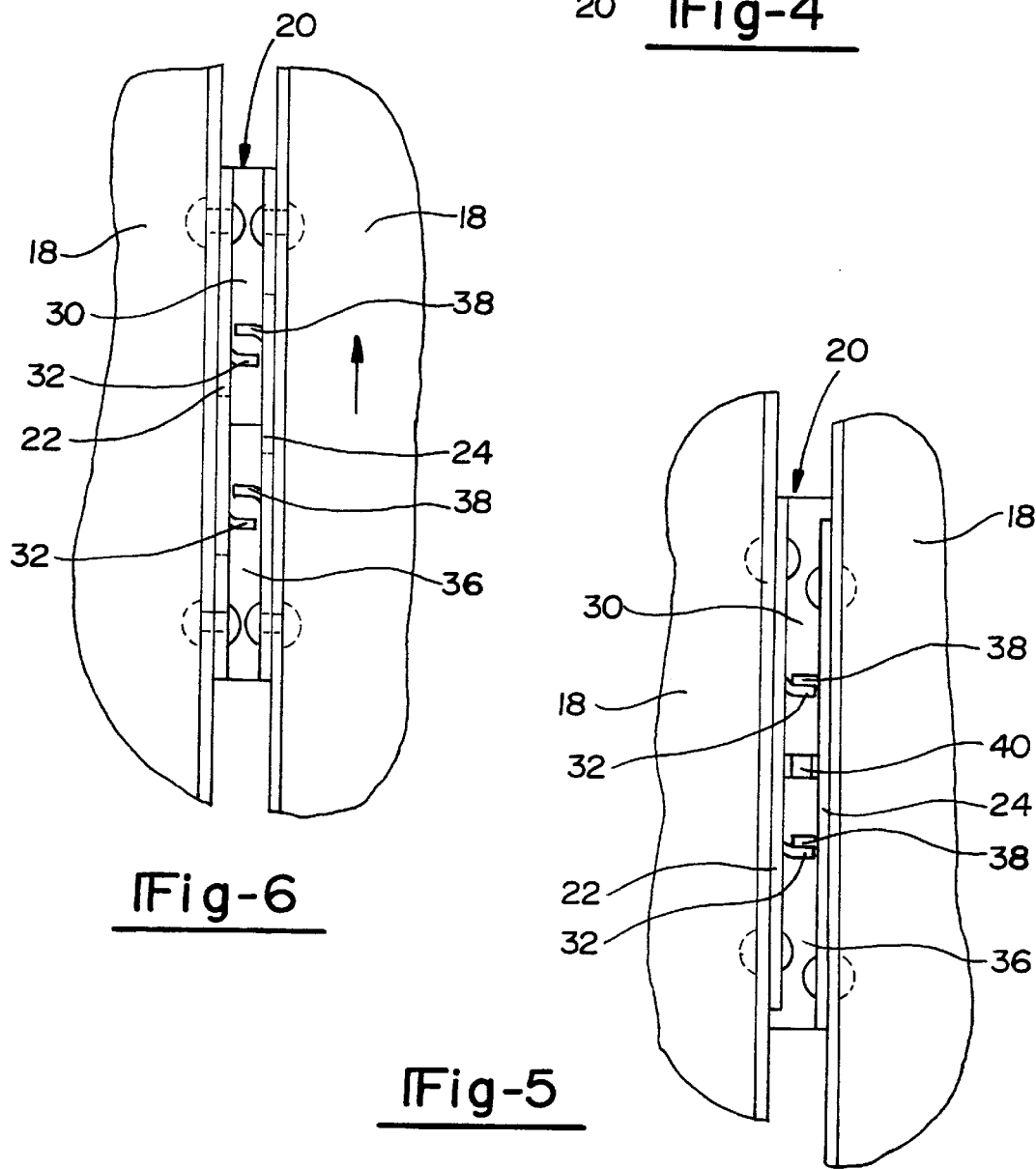

VEHICLE RAMP CONSTRUCTION

BACKGROUND OF THE INVENTION

I. Field of the Invention

This invention relates to folding ramps for moving items into the bed of a utility vehicle and, in particular, to a convenient hinge assembly which facilitates separation yet prevents separation when the ramp sections are deployed in side-by-side arrangement.

II. Description of the Prior Art

The popularity of utility vehicles has increased their potential uses as vehicle owners develop more applications for carrying cargo. Couple this with the popularity of smaller off-road and over-road vehicles and a natural marriage of utilitarian and recreational vehicles is the result. Many ramps are simple wood platforms set against the edge of the vehicle bed. However, such wood ramps can be dangerous because of the possible shifting or splintering of the ramp. In order to prevent shifting, specialized end members can be attached to the ends of the wood boards which engage the edge of the vehicle and/or the ground.

Metal ramps clearly provide improved strength to accept greater loads. However, such ramps may be cumbersome and difficult to handle. Furthermore, vehicle ramps should be capable of accommodating loads of different widths while also providing ramping surfaces of different widths if necessary. A well known means of accommodating different loads is to utilize two ramp sections in pairs. For wider loads, the ramp sections may be spaced apart in alignment with the wheels of the vehicle to be loaded. Alternatively, the ramp sections may be deployed side-by-side to accommodate a narrower wheel base.

The primary disadvantage of the prior known ramp assemblies is their difficulty of storage and transport. User friendly ramp assemblies must transport with the vehicle to allow unloading at the destination yet must be easily deployable by the user. The ramp assemblies should also accommodate various load sizes.

SUMMARY OF THE PRESENT INVENTION

The present invention overcomes the disadvantages of the prior known vehicle ramp constructions by providing a modular ramp section which may be utilized in single, double, triple or more arrangement to accommodate different loads. A hinge assembly detachably connects the ramp sections to prevent shifting yet allows disassembly for convenient storage and deployment.

The vehicle ramp construction includes a plurality of ramp sections adapted to engage the ground at one end and the edge of a vehicle bed at the upper end of the ramp. The ramp sections are designed to be deployed in pairs or threesomes to accommodate indifferent load sizes and are interconnected by hinge assemblies along the edge of the ramp sections. The hinge assemblies prevent separation of connected ramp sections when deployed in planar arrangement yet permit selective separation of the ramp sections for transport or storage. The hinge assemblies include a female component secured to a first ramp section and a male component secured to a second ramp section. The female component includes a tubular sleeve formed on a mounting plate while the male component includes a pin member extending from a mounting plate. The pin member is matingly received within the sleeve to connect the components of the hinge. The mounting plates of each of the male and female components are provided with stops in the form of flanges which interact when the ramp sections are in the same plane to prevent separation of the hinge. The stops prevent longitudinal movement of the hinge components relative to each other thereby preventing separation of the ramp sections. In order to separate the ramp sections, one section must be pivoted at an angle to the connected section thereby disengaging the stops and allowing removal of the pin member from the sleeve.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing in which like reference characters refer to like parts throughout the views and in which:

FIG. 1 is a perspective view of a vehicle with ramp sections embodying the present invention mounted thereto;

FIG. 2 is a perspective view of the vehicle with the ramp sections interconnected;

FIG. 3 is an enlarged perspective view of a hinge assembly for interconnecting the ramp sections;

FIG. 4 is an end view of the hinge assembly interconnecting the ramp sections;

FIG. 5 is a top view of the hinge assembly taken along lines 5—5 of FIG. 4; and

FIG. 6 is a top view of the hinge assembly partially disassembled.

DETAILED DESCRIPTION OF A PREFERRED EMBODIMENT OF THE PRESENT INVENTION

Referring first to FIGS. 1 and 2, there is shown a vehicle 10 preferably having a bed 12 for transporting cargo including smaller wheeled vehicles such as sport vehicles, mowers, etc. The cargo bed 12 has a rear opening 14 to facilitate loading using a ramp construction 16 embodying the present invention. The ramp 16 is designed to provide a sloped loading surface which engages the ground at one end and the vehicle cargo bed 12 at the other end such that items wheeled up the ramp into the cargo bed 12.

The ramp construction 16 embodying the present invention comprises a plurality of ramp sections 18 which may be used in two or more combinations to form the desired ramp configuration. The ramp sections 18 may be deployed in spaced apart arrangement (FIG. 1) or side-by-side arrangement (FIG. 2). In order to facilitate the deployment and subsequent detachment and storage of the ramp 16, the ramp sections 18 include a hinge assembly 20 for interconnecting the ramp sections 18 and alternatively folding the ramp construction 16 for storage. The hinge assembly 20 selectively maintains the ramp sections 18 interconnected to form the desired ramp 16 as will be subsequently described.

Referring now to FIGS. 3 through 6, the hinge assembly 20 includes a first component 22 mounted to one of the ramp sections 18 and a second component 24 mounted to another of the ramp sections 18. Preferably the hinge components 22, 24 are secured to an edge 26 of the ramp sections 18 to facilitate interconnection upon deployment of the ramp. The first component 22 includes a mounting plate 28 for securing the first hinge component 22 to the ramp section 18 and a tubular sleeve 30 integrally formed with the plate 28. At least one stop member 32 extends perpendicular to the mounting plate 28. Similarly, the second component 24 includes a mounting plate 34 for securing the second hinge component 24 to the ramp sections 18 and a tubular sleeve 36 integrally formed with the mounting plate 34. At least one stop member 38 extends perpendicular to the mounting plate 34. Disposed within the sleeve 36 of the second component 24 is a hinge pin 40 adapted to be removably received within the sleeve 30 of the first component 22 to interconnect the hinge components 22,24.

The hinge assembly 20 facilitates the selective interconnection of the ramp sections 18 to form a sturdy ramp 16 for loading and unloading the vehicle bed 12. The ramp 16 may be deployed one section 18 at a time to construct the desired ramp configuration. After placing the first ramp section 18 sloping against the vehicle 10, the next section 18 can be deployed in side-by-side engagement. While holding the next ramp section 18 at an angle to the first section 18, the hinge pin 40 may be inserted into the tubular sleeve 30 of the first hinge component 22 to hingedly interconnect the ramp sections 18. Upon deploying the ramp sections 18 in planar arrangement, the edges 26 of the ramp section 18 are brought together, as shown in FIGS. 5 and 6. The stop members 32,38 are now in alignment preventing longitudinal movement of the first hinge component 22 relative to the second hinge component 24 as long as the hinge 20 is closed. To separate the ramp sections for storage, the hinge 20 is opened by holding one ramp section 18 at an angle to the other ramp section 18 thereby disengaging the stop members 32,38 of the hinge components 22,24. The hinge pin 40 may be withdrawn from the tubular sleeve 30 to separate the hinge components 22,24 and the ramp sections 18. Thus, the hinge assembly 20 forms a secure interconnection between the ramp section 18 yet allows simple deployment and storage of the ramp 16 section by section to form the necessary work surface. Hinge components may be attached to both side edges of the ramp sections 18 to allow deployment of three or more ramp sections 18.

The foregoing detailed description has been given for clearness of understanding only and no unnecessary limitations should be understood therefrom as some modifications will be obvious to those skilled in the art without departing from the scope and spirit of the appended claims.

What is claimed is:

1. A modular ramp construction comprising:

a first ramp section having a first hinge component secured thereto; and a second ramp section having a second hinge component secured thereto;

said first hinge component having a tubular sleeve formed on a mounting plate with at least one stop flange extending perpendicular to said mounting plate and said second hinge component having a hinge pin extending from a second mounting plate with at least one stop flange extending perpendicular to said second mounting plate, said hinge pin being removably received within said tubular sleeve to selectively connect said first and second ramp sections, said stop flanges of said first and second hinge components selectively preventing longitudinal movement of said first hinge component relative to said second hinge component when said first and second ramp sections are deployed in a planar orientation.

2. The ramp construction as defined in claim 1 wherein said first and second hinge components include cooperating stop flanges selectively preventing longitudinal movement of said first hinge component relative to said second hinge component to maintain interconnection of said first and second ramp sections.

3. The ramp construction as defined in claim 2 wherein said hinge pin of said second hinge component is selectively removable from said tubular sleeve of said first hinge component to separate said first and second ramp sections upon deploying said first and second ramp sections in a non-planar orientation thereby disengaging said stop flanges of said first hinge component and said second hinge component.

4. The ramp construction as defined in claim 3 wherein said first and second hinge components are mounted to an outside peripheral edge of said first and second ramp sections respectively.

5. A modular ramp construction comprising:

a first ramp section having a plurality of first hinge components secured to an outer peripheral edge thereof, said first hinge components including a tubular sleeve;

a second ramp section having a plurality of second hinge components secured to an outer peripheral edge thereof, said second hinge components including a hinge pin adapted to be selectively received within said tubular sleeve of said first hinge component to detachably connect said first and second ramp sections together;

a plurality of stop flanges formed on said first and second hinge components, said stop flanges selectively preventing longitudinal movement of said first ramp section relative to said second ramp section preventing separation of said first and second ramp section, said ramp section being separable upon rotation of said first and second ramp sections into a non-planar orientation thereby disengaging said stop members and longitudinally displacing said hinge pins from said tubular sleeves;

said first hinge component includes a first mounting plate mounted to said outer peripheral edge of said first ramp section; second hinge component including a second mounting plate mounted to said outer peripheral edge of said second ramp section, said stop flanges formed perpendicular to respective said first and second mounting plates such that deployment of said ramp sections in a planar orientation positions said first and second mounting plates parallel to each other selectively preventing longitudinal movement of said first ramp section relative to said second ramp section.

\* \* \* \* \*